July 28, 1959 F. HELPAP 2,897,270

CIRCUIT-ARRANGEMENT FOR USE IN MAGNETIC RECORDERS

Filed July 7, 1955 2 Sheets-Sheet 1

INVENTOR
FERDINAND HELPAP
BY Fred M. Vogel
AGENT

CIRCUIT-ARRANGEMENT FOR USE IN MAGNETIC RECORDERS

Filed July 7, 1955 2 Sheets-Sheet 2

INVENTOR
FERDINAND HELPAP
BY Fred M. Vogel
AGENT

United States Patent Office 2,897,270

Patented July 28, 1959

2,897,270

CIRCUIT-ARRANGEMENT FOR USE IN MAGNETIC RECORDERS

Ferdinand Helpap, Baden, Vienna, Austria, assignor, by mesne assignments, to North American Philips Company, Inc., New York, N.Y., a corporation of Delaware Application July 7, 1955, Serial No. 520,592

Claims priority, application Austria July 9, 1954

2 Claims. (Cl. 179—1)

This invention relates to circuit-arrangements for use in magnetic recorders in which the reproducing amplifier comprises at least two outputs for the output voltage which may be made operative at will.

Technological advances have rendered possible the construction of magnetic recorders which are of a comparatively small size and hence easily transportable, which recorders comprise not only the driving mechanism and the amplifiers, but also a reproducing loudspeaker. A record may thus immediately be reproduced by such arrangements. In order to avoid restriction to the limited possibilities afforded by a small loudspeaker incorporated in a small casing, in most cases steps have been taken to insure that the output voltage provided by the reproducing amplifier may be derived from the incorporated loudspeaker and applied at will to one or more other outputs. These may comprise, for example, terminals intended for the connection of an external loudspeaker, or a so-called "line output," which serves to permit the connection of further equipment (low-frequency amplifier, of a wireless set, further amplifiers measuring device, etc.).

The reproducing amplifier should satisfy different requirements according to the output to which the amplifier is connected. If the magnetic recorder serves for direct acoustic reproduction, and hence the output voltage of the reproducing amplifier is applied directly to the incorporated loudspeaker, the output voltage is naturally required to be variable in value. As is well-known, the sensitivity of the ear for the different frequencies is greatly dependent upon the strength of reproduction. In order to insure substantially the same timbre at greater or smaller sound intensity, it is preferred to carry out the control, as is common in practice in wireless sets, as a so-called physiologically correct control, whereby more particularly the low frequencies are greatly accentuated with respect to the intermediate frequencies when a low sound intensity is adjusted. It needs no mention that the total frequency curve of the reproducing amplifier will advantageously be matched to the incorporated loudspeaker.

When use is made of an external loudspeaker, it is generally necessary to impose similar requirements. If possible, particular accentuation of the low-frequencies, which is reckoned for the incorporated loudspeaker which is in most cases comparatively small and comprises a small baffle plate, may be omitted.

However, for the line output the conditions are quite different. At any rate an optimum linearity of the frequency curve of this output is desired. That is, suppression of the distortion of the reproducing amplifier has to be effected in such a manner that the amplifier, with the aid of a sound recording medium properly provided with a record, provides a frequency-linear output voltage at the line output. The question of whether the output voltage should be controlled is dependent upon the particular purpose of the line output. If, for example, the output voltage of the magnetic recorder is used to feed the input of the low-frequency amplifier of a wireless set, it is undesirable to control the output voltage. This is because only if the magnetic recorder with a properly controlled band provides approximately a similar voltage, at the low-frequency amplifier, to that provided by an average radio-transmitter from the demodulator stage, does the volume control in the wireless receiver operate in the proper way.

It has been hitherto impossible to make allowance for such contradictory requirements. However, in conformity with the manifold possibilities of use, the output voltage of magnetic recorders may be applied at will to an incorporated loudspeaker, or to a connection for an external loudspeaker, or to connections intended for passing the voltage via a lead ("line") to another device ("line outputs"). Switching over from one output to the other is effected either by hand or automatically in such manner that, normally, the incorporated loudspeaker is connected. Also, switchover to the desired connection takes place only when the sockets, pawls, or the like, serving for the other connections are effectively used. However, it is thus impossible, for the above-mentioned reasons, to obtain optimum conditions for each connection.

The present invention relates to magnetic recorders in which the reproducing amplifier comprises at least two outputs for the output voltage which may be made operative, as desired, to satisfy a plurality of uses with optimum conditions existing for each particular use.

According to the invention, at at least one output, the means by which the output voltage is applied to this output, more particularly pawls, switches, or the like, also automatically cause switching-over of those parts of the reproducing amplifier which serve for suppression of distortion and for the control, in such a manner that the output voltage which becomes operative is matched in regard to frequency variation and magnitude to the requirements to be imposed upon the output concerned.

In order that the invention may be readily carried into effect, it will now be described, by way of example, with reference to the accompanying drawings, wherein:

Fig. 1 is a schematic diagram of a reproducing amplifier of a magnetic recorder embodying the circuit arrangement of the present invention;

Fig. 1*a* is a schematic diagram of a modification of a portion of the embodiment of Fig. 1;

Figure 1:
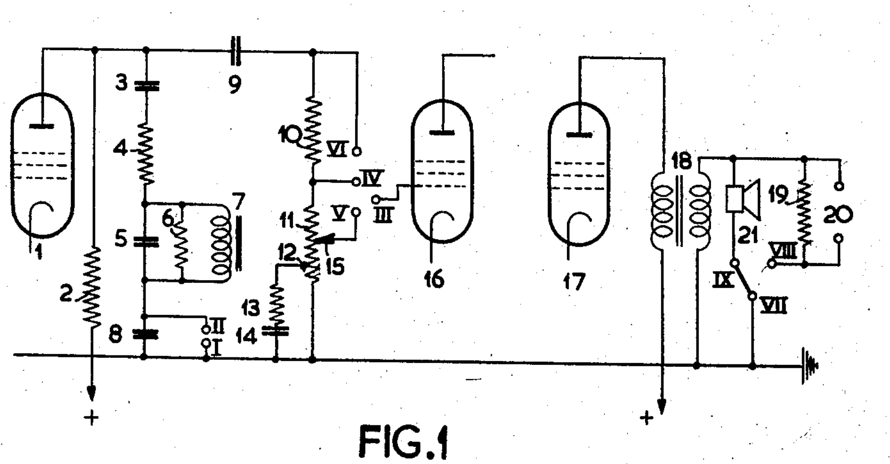

In Fig. 1, the output of the reproducing amplifier is connected either to an incorporated loudspeaker or to the input of the low-frequency amplifier of a wireless receiver. For the sake of clarity, those parts only are shown which relate to the present invention. Switching devices required to utilize parts of this amplifier also for recording purposes thus are not shown.

In the circuit-arrangement of Fig. 1, the voltage provided by the reproducing head (not shown) is amplified by an amplifying tube 1, which acts upon a resistor 2 when fed on direct current, but which acts upon the whole complex of circuit elements located between its anode and the grid of a subsequent tube 16 when fed on alternating current. Distortion of the frequency curve is suppressed by the circuit elements 3 to 7 in a known manner such that, when a properly taken record is reproduced, the frequency curve at the output of the amplifier becomes rectilinear. In this case a capacitor 8 must be short-circuited by contacts I, II. When the contacts are opened, the low frequencies are particularly accentuated.

A voltage divider comprising a fixed resistor 10 and a potentiometer 11 is connected via a capacitor 9 to the complex which serves to suppress distortion. The potentiometer 11 comprises a tapping 12 for providing the parallel branch constituted by a resistor 13 and a capacitor 14. When a frequency linear constant output voltage is desired, the grid of the tube 16 is fixed via switching contacts III, IV between the resistor 10 and the potentiometer 11. If necessary, in determining the complex 3 to 7, allowance may be made for the frequency-dependency introduced into the voltage divider 10, 11 by the parallel branch 13, 14. When, with the aid of contacts III, V the grid of tube 16 is connected to a sliding contact 15 of the potentiometer 11 with simultaneous short-circuiting (IV, VI) of the resistor 10, the complete voltage supplied by the tube 1 is adjustably available with particular accentuation of the low-frequencies when the sliding contact 15 is moved downwardly ("physiologically correct volume control").

Figure 1A:
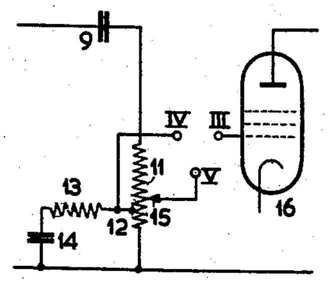

In Fig. 1*a*, the tapping 12 of the potentiometer 11 is used for the voltage division, the resistor 10 being omitted.

The tube 16 is followed by a tube 17 as the final amplifier. An output transformer 18 supplies the output voltage either to a "line output" 20, with which a resistor 19 is connected in parallel for maintaining the proper load, or to an incorporated loudspeaker 21. Switchover is effected with the aid of contacts VII, VIII, IX, which may be controlled, for example, by a switching socket (pawl) of the output 20. When the output 20 is not in use, the contacts VII, IX are closed and the incorporated loudspeaker 21 is operative. When the "line" is connected to the output 20, the contacts VII and IX are separated and, instead thereof, the contacts VII and VIII engage one another. Simultaneously with this switching operation, the contacts I to VI are switched-over in such a manner that, when the "line" is operative, the contacts I, II and III, IV are closed, and when the loudspeaker is operative, the contacts III, V and IV, VI are closed and the contacts I, II are open. When the incorporated loudspeaker 21 is used, an additional fixed accentuation of the bass notes thus takes place and an accentuation which increases with decreasing volume occurs. The voltage set up across the line output 20 is constant not adjustable and frequency linear.

Figure 2:
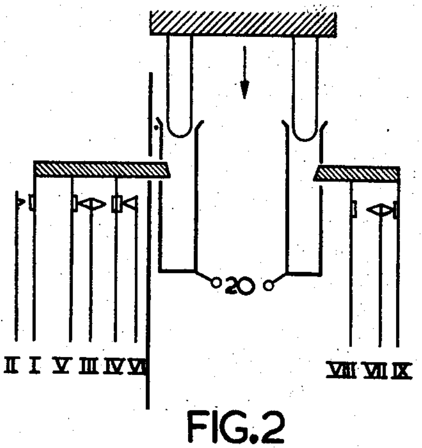
Fig. 2 is a schematic diagram of an embodiment of the switching means of the circuit arrangement of the present invention.

Fig. 2 indicates the operation of the switching means when the outputs are changed over automatically with the aid of a plug socket (pawl). The contacts are at rest position and hence the loudspeaker 21 is operative, since the line output 20 is not used. Screens may be readily arranged, if necessary, between the groups of contacts, such as I to VI and VII to IX.

Figure 3:
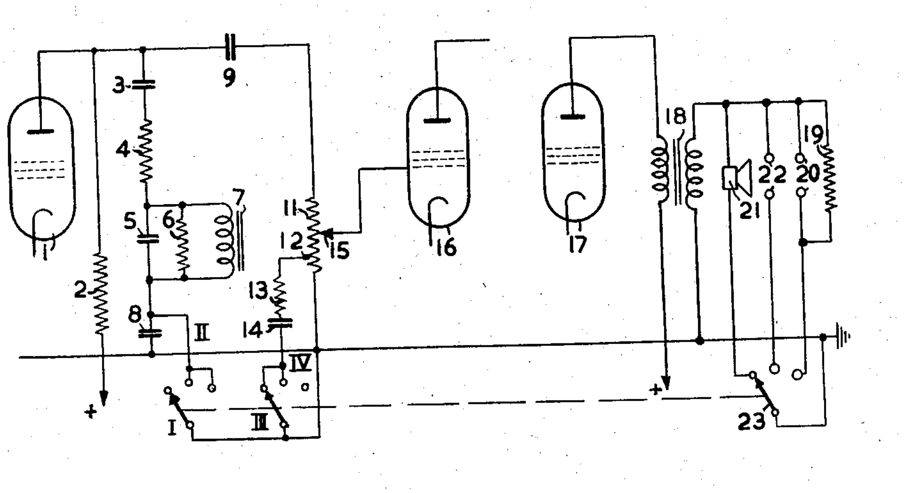
Fig. 3 is a schematic diagram of a modification of the embodiment of Fig. 1.
Figure 4:
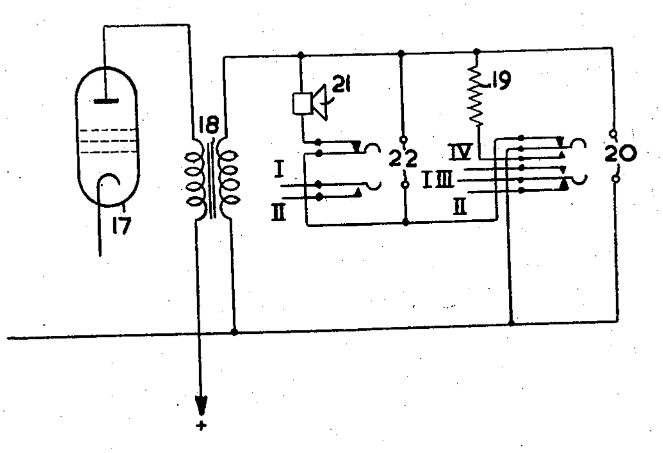
Fig. 4 is a schematic diagram of another embodiment of the switching means of the circuit arrangement of the present invention.

In Figs. 3 and 4 the output voltage may be applied to three different outputs, viz. the line output 20, the incorporated loudspeaker 21 or an output connection 22, for example for an external loudspeaker. The switch 23 required for switchover is a manually operated switch in Fig. 3. When the incorporated loudspeaker 21 is to be used, the contacts I, II remain open and the contacts III, IV are closed (additional fixed accentuation of low frequencies and physiologically correct volume control). When an external loudspeaker, to be connected to the connection 22, is used, both the contacts I, II and III, IV are closed (additional fixed accentuation of low frequencies, but physiologically correct volume). When the line output 20 is used, the contacts I, II are closed and the contacts III, IV are open (the output voltage is adjustable and frequency-linear). Arranging the contacts I to IV on the switch, to insure the above-described switching operation, needs no further description.

In Fig. 4, the outputs 20 and 22 comprise switching sockets 24 and 25, which are used for switching-over from the incorporated loudspeaker, to the output to be employed. The simultaneous switching of the contacts I to IV according to the diagram of Fig. 3 is shown in Fig. 4. The circuit elements are indicated in Figs. 3 and 4 in a similar manner as in Fig. 1.

It will be evident that the described devices are examples only. It is alternatively possible for the circuit arrangement to comprise more than 3 outputs, while all possible combinations of magnitude and frequency curve of the output voltage may be realized. The invention is not limited to making corrections to the frequency curve of the low frequencies only; if desired, it may also be used for making corrections in the range of low and high frequencies, or of the latter alone or of any desired combination of frequencies.

What is claimed is:

1. A circuit arrangement comprising an input circuit, means for applying a signal to said input circuit, an output circuit, a plurality of loads, each of said loads having a distinct frequency transmission characteristic different from the other of said loads, means coupled between said input and output circuits for controlling the frequency characteristic of said signal, and switching means for connecting a selected one of said loads to said output circuit, said switching means comprising means for operating said controlling means to vary the frequency characteristic of said signal to conform to the frequency transmission characteristic of the said selected one of said loads.

2. A circuit arrangement for a magnetic recorder comprising a reproducing amplifier having an input circuit, means for applying a signal to said input circuit, an output circuit, a plurality of loads each having a distinct frequency transmission characteristic, means coupled between said input and output circuits for controlling the frequency transmission characteristic of said amplifier, and switching means for applying signals in said output circuit to a selected one of said loads, said switching means comprising means for operating said controlling means to vary the frequency characteristic of said signal to conform to the frequency transmission characteristic of the said selected one of said loads.

References Cited in the file of this patent

UNITED STATES PATENTS

| | | |
|---|---|---|
| 2,148,994 | Mennerich | Feb. 28, 1939 |
| 2,192,959 | Ballard | Mar. 12, 1940 |
| 2,474,191 | Reid et al. | June 21, 1949 |